(12) United States Patent
Mine

(10) Patent No.: US 10,103,610 B2
(45) Date of Patent: Oct. 16, 2018

(54) MANUFACTURING METHOD OF CORE FOR ROTARY ELECTRIC MACHINE

(71) Applicant: Toyota Jidosha Kabushiki Kaisha, Toyota-shi Aichi-ken (JP)

(72) Inventor: Kouichi Mine, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 297 days.

(21) Appl. No.: 15/045,988

(22) Filed: Feb. 17, 2016

(65) Prior Publication Data

US 2016/0241116 A1 Aug. 18, 2016

(30) Foreign Application Priority Data

Feb. 18, 2015 (JP) .................. 2015-029952

(51) Int. Cl.
*H02K 15/00* (2006.01)
*H02K 15/02* (2006.01)

(52) U.S. Cl.
CPC ......... *H02K 15/02* (2013.01); *H02K 2201/09* (2013.01)

(58) Field of Classification Search
CPC .................. H02K 1/18; H02K 15/02
See application file for complete search history.

(56) References Cited

U.S. PATENT DOCUMENTS

| | | | | |
|---|---|---|---|---|
| 4,794,778 A * | 1/1989 | Fritzsche | ................. | H02K 1/16 29/596 |
| 4,940,913 A * | 7/1990 | Fritzsche | ................. | H02K 1/16 29/609 |
| 5,477,096 A * | 12/1995 | Sakashita | ................. | H02K 1/06 310/216.016 |
| 5,755,023 A | 5/1998 | Neuenschwander | | |
| 5,829,120 A * | 11/1998 | Uchida | ................. | H02K 1/2773 29/598 |
| 6,191,510 B1 * | 2/2001 | Landin | ................. | H02K 1/04 310/216.016 |
| 6,718,616 B2 * | 4/2004 | Fukui | ................. | H02K 15/022 29/564.1 |
| 7,285,891 B2 * | 10/2007 | Yamamoto | ............. | H02K 1/148 310/216.067 |

(Continued)

FOREIGN PATENT DOCUMENTS

| | | |
|---|---|---|
| CN | 103035374 A | 4/2013 |
| JP | H09294343 A | 11/1997 |
| JP | H10262350 A | 9/1998 |

(Continued)

*Primary Examiner* — Carl Arbes

(74) *Attorney, Agent, or Firm* — Dinsmore & Shohl LLP

(57) ABSTRACT

A manufacturing method of a core for a rotary electric machine includes: forming a crimped portion on both a first magnetic steel sheet and a second magnetic steel sheet. The crimped portion has a recessed portion that is recessed from a first surface and a protruding portion that protrudes from a second surface in a position on the reverse side of the recessed portion on the second surface; and stacking the first magnetic steel sheet and the second magnetic steel sheet while curving the first magnetic steel sheet such that a first surface side bulges out, and inserting the protruding portion of the crimped portion of the second magnetic steel sheet into the recessed portion of the crimped portion of a curved first magnetic steel sheet.

4 Claims, 15 Drawing Sheets

(56) References Cited

U.S. PATENT DOCUMENTS

| | | | |
|---|---|---|---|
| 7,626,306 B2 * | 12/2009 | Sato | H02K 1/146 |
| | | | 310/216.055 |
| 2007/0035199 A1 * | 2/2007 | Yamamoto | H02K 1/148 |
| | | | 310/269 |

FOREIGN PATENT DOCUMENTS

| JP | 2001-095209 A | | 4/2001 |
|---|---|---|---|
| JP | 2006-345657 A | | 12/2006 |
| JP | 2006345657 A | * | 12/2006 |
| JP | 2008-011615 A | | 1/2008 |
| JP | 2011-055607 A | | 3/2011 |

* cited by examiner

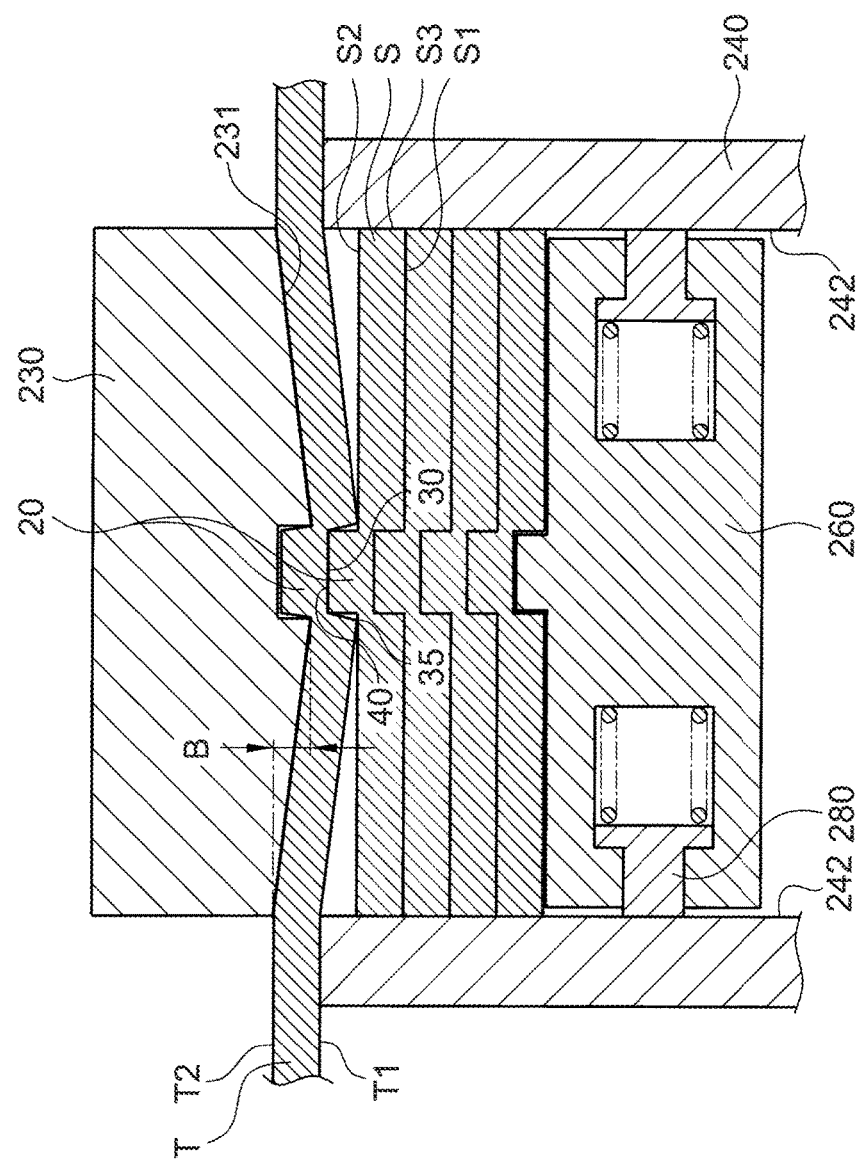

MANUFACTURING METHOD OF CORE FOR ROTARY ELECTRIC MACHINE

INCORPORATION BY REFERENCE

The disclosure of Japanese Patent Application No. 2015-029952 filed on Feb. 18, 2015 including the specification, drawings and abstract is incorporated herein by reference in its entirety.

BACKGROUND

1. Technical Field

The present specification relates to a manufacturing method of a rotor core and a stator core that are able to be used in a rotary electric machine. More particularly, the present specification relates to a manufacturing method of a core for a rotary electric machine, in which a plurality of magnetic steel sheets are stacked and joined together.

2. Description of Related Art

A rotor core and a stator core used in a rotary electric machine such as an electric motor or a generator are manufactured by stacking a plurality of magnetic steel sheets and integrating them together to form a single unit. Also, the rotor core and the stator core are manufactured by, for example, stacking a plurality of laminated steel sheets flat, and joining adjacent magnetic steel sheets together by crimping.

That is, first, a crimped portion in which one surface side is a protruding portion and the other surface side is a recessed portion, is formed on a portion of the magnetic steel sheets. Then, the surface on the protruding portion side of the crimped portion of one magnetic steel sheet is placed facing the surface on the recessed portion side of the crimped portion of another magnetic steel sheet, and the two magnetic steel sheets are joined together by stacking them while fitting the protruding portion of the crimped portion of the one into the recessed portion of the crimped portion of the other.

For example, Japanese Patent Application Publication No. 2006-345657 (JP 2006-345657 A) describes a process of punching a magnetic steel sheet on which the crimped portion is already formed, and stacking the punched magnetic steel sheet together with another magnetic steel sheet that has already been punched and is held in a die. Also, when the magnetic steel sheet is being stacked, the recessed portion of the crimped portion of the punched magnetic steel sheet is fit together with the protruding portion of the crimped portion of the magnetic steel sheet held in the die, such that the two sheets are joined together. Also, as a punch, a punch is used in which a recessed portion is formed on a portion corresponding to the protruding portion of the crimped portion of the magnetic steel sheet. Using this punch enables the protruding portion of the crimped portion of the punched magnetic steel sheet to be inserted into the recessed portion of the other magnetic steel sheet that is held in the die, while supporting the area around the protruding portion of the crimped portion. As a result, the magnetic steel sheets are able to be stacked while being joined together, without deforming the magnetic steel sheets.

However, with the related art described above, there are cases in which the crimped portions that are formed beforehand on the two stacked magnetic steel sheets end up being out of position. That is, the protruding portion of one of the two stacked magnetic steel sheets is unable to suitably fit into the recessed portion of the other magnetic steel sheet. Therefore, the two stacked magnetic steel sheets may not be able to be suitably joined by the crimped portions.

SUMMARY

The present specification thus provides a manufacturing method of a core for a rotary electric machine in which two magnetic steel sheets in which crimped portions are formed beforehand are able to be stacked and reliably joined by the crimped portions.

A manufacturing method related to the present specification is a manufacturing method of a core for a rotary electric machine. The core includes a plurality of magnetic steel sheets. The magnetic steel sheets each has a first surface and a second surface that is on a reverse side of the first surface. The plurality of magnetic steel sheets includes a first magnetic steel sheet and a second magnetic steel sheet that is adjacent to the first magnetic steel sheet. The manufacturing method includes: forming a crimped portion on both the first magnetic steel sheet and the second magnetic steel sheet, the crimped portion having a recessed portion that is recessed from the first surface and a protruding portion that protrudes from the second surface in a position on the reverse side of the recessed portion on the second surface; and stacking the first magnetic steel sheet and the second magnetic steel sheet while curving the first magnetic steel sheet such that a first surface side bulges out, and inserting the protruding portion of the crimped portion of the second magnetic steel sheet into the recessed portion of a crimped portion of the curved first magnetic steel sheet.

In the manufacturing method of a core for a rotary electric machine of this present specification, the first magnetic steel sheet is stacked on the second magnetic steel sheet while the first magnetic steel sheet is curved such that the first surface side bulges out. That is, because the first magnetic steel sheet is curved when stacking the sheets, the open portion of the recessed portion of the crimped portion of the first magnetic steel sheet is open wider than it is when the first magnetic steel sheet is not curved. Therefore, the protruding portion of the crimped portion of the second magnetic steel sheet is able to be reliably inserted into the recessed portion of the crimped portion of the first magnetic steel sheet through the opening of the recessed portion. As a result, the two magnetic steel sheets in which the crimped portions have been formed beforehand are able to be stacked, as well as reliably joined together by these crimped portions.

A punched sheet is a magnetic steel sheet after punching that forms an outer shape of the magnetic steel sheet is performed. A pre-punched sheet is a magnetic steel sheet before the punching is performed. The first magnetic steel sheet may be the punched sheet. The second magnetic steel sheet may be the pre-punched sheet. The punching of the pre-punched sheet may be performed in a state in which at least a tip end of the protruding portion of the crimped portion of the second magnetic steel sheet is inserted into the recessed portion of the crimped portion of the curved first magnetic steel sheet. According to this structure, punching of the pre-punched sheet is able to be performed while the pre-punched sheet and the punched sheet are positioned by the crimped portions.

BRIEF DESCRIPTION OF THE DRAWINGS

Features, advantages, and technical and industrial significance of exemplary embodiments of the present specification will be described below with reference to the accompanying drawings, in which like numerals denote like elements, and wherein:

FIG. 17 is a view illustrating third and subsequent stacked sheets at the stacking portion according to the second example embodiment.

DETAILED DESCRIPTION OF EMBODIMENTS

Hereinafter, specific example embodiments of the present specification will be described in detail with reference to the accompanying drawings. The example embodiments described below are embodiments which have been applied to a manufacturing method of a rotor core used in a rotary electric machine such as an electric motor or a generator.

First Example Embodiment

Figure 1:
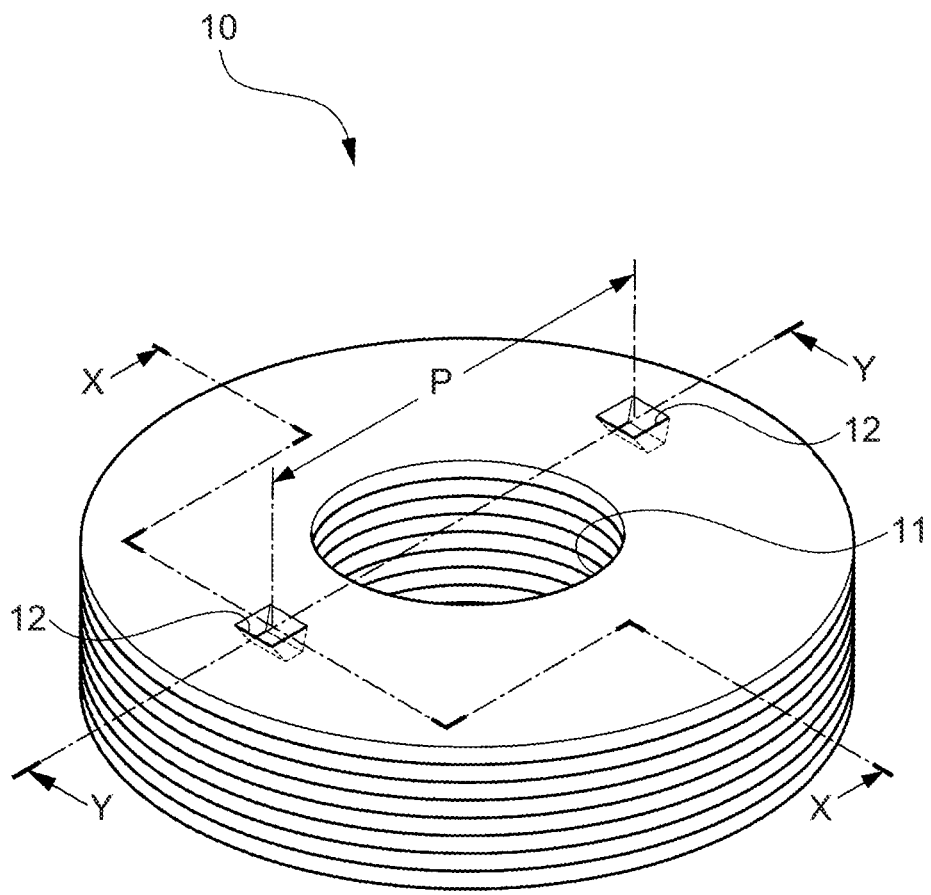
FIG. 1 is a perspective view of a rotor core according to an example embodiment of the present specification.
Figure 2:
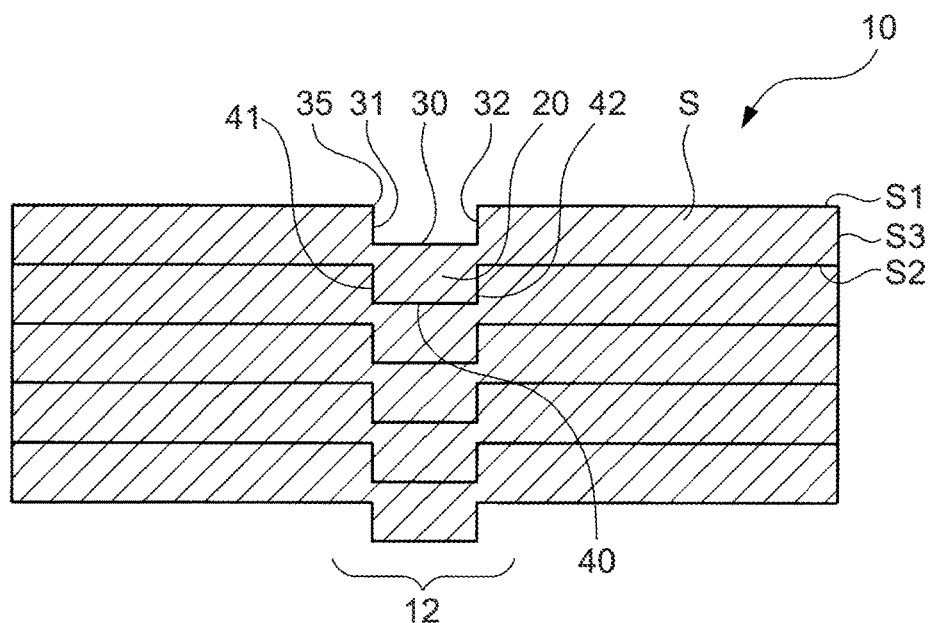
FIG. 2 is a sectional view taken along line X-X in FIG. 1 of the rotor core according to the example embodiment.
Figure 3:
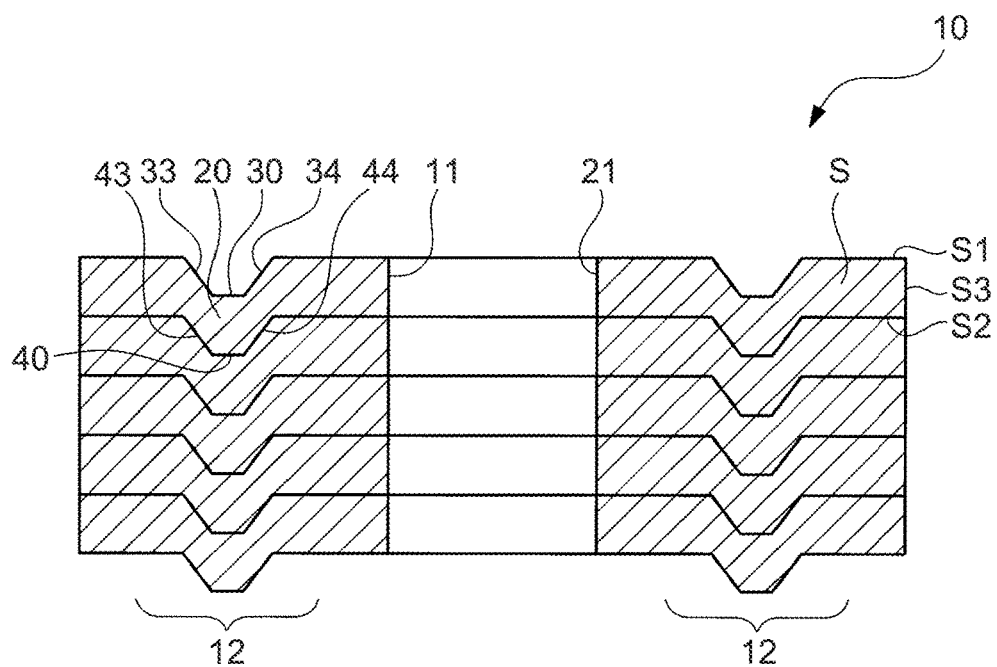
FIG. 3 is a sectional view taken along line Y-Y in FIG. 1 of the rotor core according to the example embodiment.

FIG. 1 is a perspective view of a rotor core 10 manufactured by the manufacturing method according to a first example embodiment of the present specification. Also, FIG. 2 is a sectional view of the rotor core 10 shown in FIG. 1 taken along line X-X. FIG. 3 is a sectional view of the rotor core 10 shown in FIG. 1 taken along line Y-Y. The rotor core 10 is formed by stacking a plurality of magnetic steel sheets (hereinafter, simply referred to as "sheets") S together in a thickness direction, as shown in FIGS. 1 to 3.

As shown in FIG. 1, a rotating shaft assembly hole 11 that passes through the rotor core 10 in the stacking direction is provided in the center of the rotor core 10. This rotating shaft assembly hole 11 is a location where a rotating shaft will later be assembled. Also, a joining portion 12 is provided on the rotor core 10, as shown in FIG. 1. Two of these joining portions 12 are provided in rotational positions 180° apart with respect to the center axis of the rotating shaft assembly hole 11 in the rotor core 10. Also, the interval P between these joining portions 12 is shown in FIG. 1. Hereinafter, portions such as the joining portions 12 that are provided in plurality may be referred to in the singular to simplify the description and facilitate understanding.

Also, the plurality of sheets S are joined to one another at these joining portions 12. That is, the rotor core 10 in which the plurality of sheets are integrated together is formed by the plurality of sheets S being joined at the joining portions 12.

As shown in the sectional view of FIG. 2, each sheet S of the rotor core 10 is stacked with a first surface S1 facing up and a second surface S2 facing down in FIG. 2. An outer shape S3 of the sheets S is also shown in FIG. 2. Also, as shown in FIG. 2, a crimped portion 20 is formed on each sheet S, at the position of the joining portion 12 of the rotor core 10. That is, the joining portion 12 of the rotor core 10 is formed by the crimped portions 20 of the sheets S overlapping with each other in the stacking direction.

The crimped portion 20 is a recessed portion 30 that is recessed from the first surface S1 on the first surface S1 side of the sheet S. The crimped portion 20 is also a protruding portion 40 that protrudes from the second surface S2 on the second surface S2 side of the sheet S. Further, side surfaces 31 and 32 of the recessed portion 30 in the cross-section taken along line X-X are formed substantially parallel to the stacking direction. Also, side surfaces 41 and 42 of the protruding portion 40 in the cross-section taken along line X-X are also formed substantially parallel to the stacking direction.

Also, the protruding portion 40 of the crimped portion 20 of each sheet S fits into the recessed portion 30 of the sheet S on the lower side through the opening 35 of the recessed portion 30. That is, the side surfaces 41 and 42 of the protruding portion 40 of the crimped portion 20 of each sheet S are sandwiched by the side surfaces 31 and 32 of the recessed portion 30 of the sheet S on the lower side. As a result, each sheet S is joined to the sheet S adjacent.

Also, as shown in the sectional view of FIG. 3, a through-hole 21 is formed in the center of each sheet S. Also, the rotating shaft assembly hole 11 in the rotor core 10 is formed by the through-holes 21 of the plurality of sheets S being overlapped with each other in the stacking direction.

Also, as shown in FIG. 3, side surfaces 33 and 34 of the recessed portion 30 of the crimped portion 20 in the cross-section taken along line Y-Y are inclined surfaces that are inclined in a direction approaching each other farther away from the first surface S1. Also, the side surfaces 43 and 44 of the protruding portion 40 of the crimped portion 20 in the cross-section taken along line Y-Y are also inclined surfaces that are inclined in a direction approaching each other farther away from the second surface S2.

Figure 4:
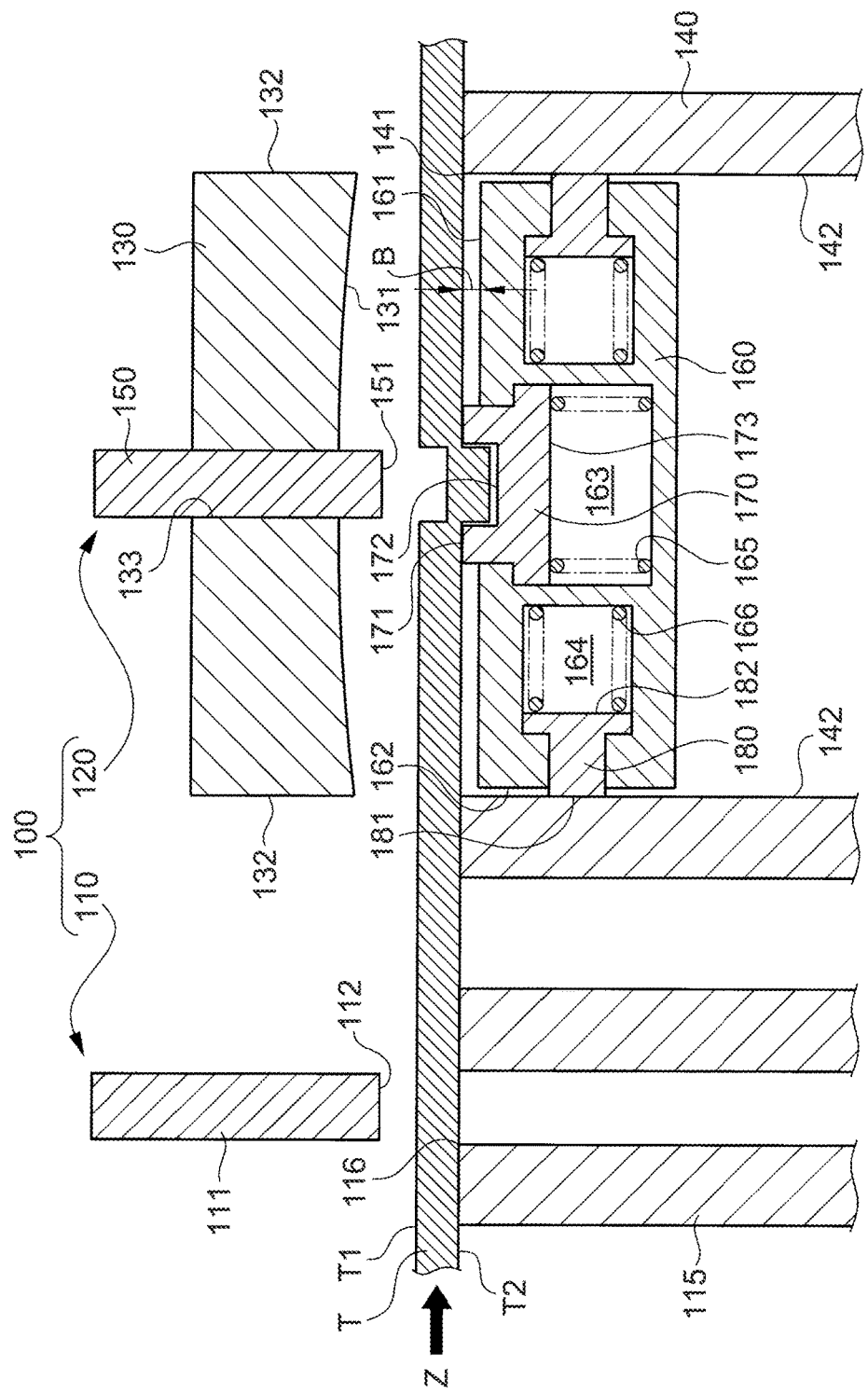
FIG. 4 is a view of a rotor core manufacturing apparatus according to a first example embodiment of the present specification.

FIG. 4 is a view of a rotor core manufacturing apparatus 100 used to manufacture the rotor core 10 of this example embodiment. As shown in FIG. 4, the rotor core manufacturing apparatus 100 has a crimped portion forming portion 110 and a stacking portion 120.

The crimped portion forming portion 110 is able to form the crimped portion 20 of the sheet S. The stacking portion 120 is able to manufacture the rotor core 10 by stacking the plurality of sheets S one by one. Also, when stacking the sheets S, the stacking portion 120 joins two sheets S that have been stacked with the first surface S1 and the second surface S2 facing each other, using the crimped portions 20 of these sheets S. Moreover, the stacking portion 120 of this example embodiment also performs punching to form the outer shape S3 of the sheet S.

FIG. 4 also shows a workpiece T that is fed into the rotor core manufacturing apparatus 100. The workpiece T is fed into the rotor core manufacturing apparatus 100 from left to right as indicated by arrow Z. Moreover, the workpiece T is fed into the rotor core manufacturing apparatus 100 with a first surface T1 facing up and a second surface T2 facing down.

Then, the crimped portion 20 is formed in the workpiece T at the crimped portion forming portion 110. Also, the workpiece T is made into the sheet S and stacked by punching at the stacking portion 120. That is, the workpiece T is a long magnetic steel sheet prior to being made into the sheet S.

The crimped portion forming portion 110 includes a crimping punch 111 and a crimping die 115, as shown in FIG. 4. The crimping punch 111 and the crimping die 115 are arranged in positions on opposite sides of the workpiece T. More specifically, the crimping punch 111 is arranged on the first surface T1 side of the workpiece T, and the crimping die 115 is arranged on the second surface T2 side of the workpiece T. In this example embodiment, the crimping punch 111 is able to move downward toward the crimping die 115.

Also, the crimping punch 111 is arranged with a tip end 112 toward the first surface T1 of the workpiece T. The tip end 112 of the crimping punch 111 has a shape corresponding to the recessed portion 30 of the crimped portion 20 of the sheet S. The crimping die 115 is arranged with an opening 116 toward the second surface T2 of the workpiece T. The opening 116 of the crimping die 115 has a shape corresponding to the protruding portion 40 of the crimped portion 20 of the sheet S.

Furthermore, two pair of the crimping punch 111 and the crimping die 115 are arranged in the depth direction in FIG. 4. More specifically, two pairs of the crimping punch 111 and the crimping die 115 are arranged at the interval P of the crimped portions 20 of the sheet S, in the depth direction in FIG. 4.

The stacking portion 120 includes an outer shape punch 130, an outer shape die 140, a positioning portion 150, and a sliding portion 160. The outer shape punch 130 and the outer shape die 140 are able to manufacture the sheet S from the workpiece T by punching.

The outer shape punch 130 and the outer shape die 140 are arranged in positions on opposite sides of the workpiece T. More specifically, the outer shape punch 130 is arranged on the first surface T1 side of the workpiece T, and the outer shape die 140 is arranged on the second surface T2 side of the workpiece T. In this example embodiment, the outer shape punch 130 is able to move downward toward the outer shape die 140.

The outer shape punch 130 is arranged with a lower surface 131 toward the first surface T1 of the workpiece T. The lower surface 131 of the outer shape punch 130 has a recessed shape in which the center is recessed more than both the left and right sides in FIG. 4. A side surface 132 of the outer shape punch 130 has the same shape as the outer shape S3 of the sheet S. The outer shape die 140 is arranged with an opening 141 toward the second surface 12 of the workpiece T. An inner wall surface 142 of the outer shape die 140 has a shape corresponding to the outer shape S3 of the sheet S.

The positioning portion 150 is provided in a guide hole 133 formed in the outer shape punch 130. The positioning portion 150 is provided in the guide hole 133, and the guide hole 133 of the outer shape punch 130 and the positioning portion 150 are provided two by two in the depth direction in FIG. 4. That is, two of the positioning portions 150 are arranged at the interval P of the crimped portion 20 of the sheet S.

Also, the positioning portion 150 is able to move downward toward the outer shape punch 130, along the guide hole 133. Furthermore, the positioning portion 150 of this example embodiment is able to move separately at a different timing than the outer shape punch 130. Also, a tip end 151 of the positioning portion 150 has a shape corresponding to the recessed portion 30 of the crimped portion 20 of the sheet S.

The sliding portion 160 is provided inside the outer shape die 140. The sliding portion 160 has a thrusting portion 170 and a holding portion 180. A recessed portion 172 having a shape corresponding to the protruding portion 40 of the crimped portion 20 is formed on a thrusting surface 171 of the thrusting portion 170.

The thrusting portion 170 is housed, with a lower surface 173 receiving urging force from a compression spring 165, in a housing hole 163 formed open to an upper surface 161 of the sliding portion 160. The urging force from the compression spring 165 causes the thrusting surface 171 of the thrusting portion 170 to protrude farther upward than the upper surface 161 of the sliding portion 160. More specifically, the thrusting surface 171 of the thrusting portion 170 protrudes an amount equal to a length B shown in FIG. 4, from the upper surface 161 of the sliding portion 160.

The urging force on the thrusting portion 170 from the compression spring 165 is less than a pressing force from the movement of the outer shape punch 130. That is, the thrusting portion 170 moves downward by the pressing force of the outer shape punch 130 when the thrusting surface 171 is pressed on by the moving outer shape punch 130.

Also, each of a plurality of holding portions 180 is housed in a housing hole 164 formed open to a side surface 162 of the sliding portion 160, in a state in which an inside surface 182 that is toward the inside of a housing hole 164 receives urging force from a compression spring 166. This urging force from the compression spring 166 causes a tip end 181 of the holding portion 180 to protrude farther outward than the side surface 162 of the sliding portion 160.

Moreover, the plurality of holding portions 180 are provided on the sliding portion 160. The plurality of holding portions 180 are provided in a radial fashion on the sliding portion 160 when viewed from above. For example, four of the holding portions 180 may be provided.

Also, the tip end 181 of the holding portion 180 protrudes from the side surface 162 of the sliding portion 160, and is pushed against the inner wall surface 142 of the outer shape die 140. The sliding portion 160 is held inside the outer shape die 140 by this pressing force of the holding portion 180.

The holding force that pushes the holding portion 180 against the inner wall surface 142 and holds the sliding portion 160 inside the outer shape die 140 from the urging force of the compression spring 166 is not strong enough to completely stop the movement of the outer shape punch 130.

That is, the sliding portion 160 moves by the pressing force received from the outer shape punch 130 when pressed on by the outer shape punch 130.

Next, a manufacturing method of the rotor core 10 by the foregoing rotor core manufacturing apparatus 100 will be described with reference to FIGS. 4 to 12. FIGS. 4 to 12 are views of cross-sections of the workpiece T and the sheet S corresponding to the cross-section taken along line X-X shown in FIG. 1. As shown in FIG. 4, the workpiece T is fed into the rotor core manufacturing apparatus 100 in the direction of arrow Z, by being unrolled from roll material or the like. The through-hole 21 in the sheet S is formed in the workpiece T before reaching the crimped portion forming portion 110.

Figure 5:
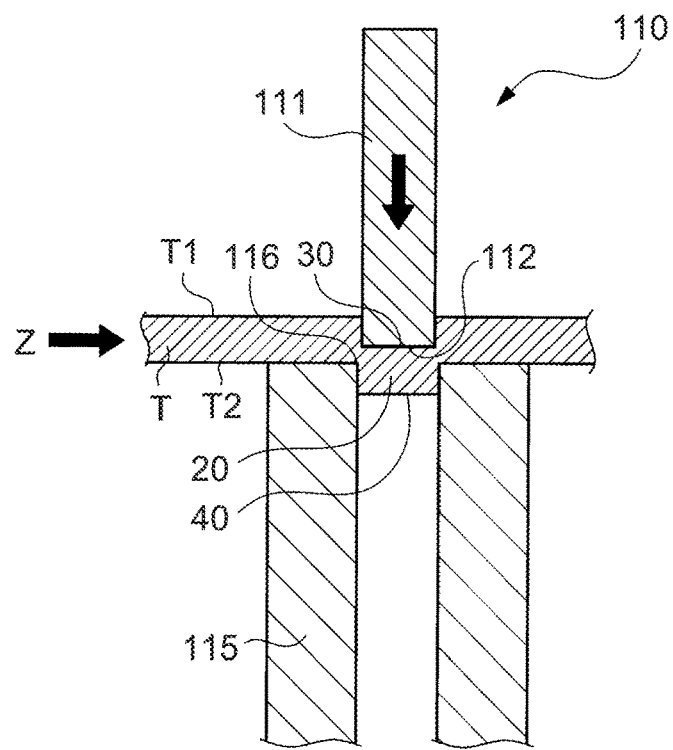
FIG. 5 is a view illustrating the formation of a crimped portion formed by a crimped portion forming portion according to the first example embodiment.

Then, at the position of the crimped portion forming portion 110, a crimped portion forming process to form the crimped portion 20 in the workpiece T is performed. That is, as shown in FIG. 5, the workpiece T is sandwiched by the crimping punch 111 that moves toward the first surface T1 and the crimping die 115 arranged on the second surface T2 side. The location on the workpiece T that is sandwiched by the crimping punch 111 and the crimping die 115 is the location where the crimped portion 20 is formed on the sheet S.

Figure 6:
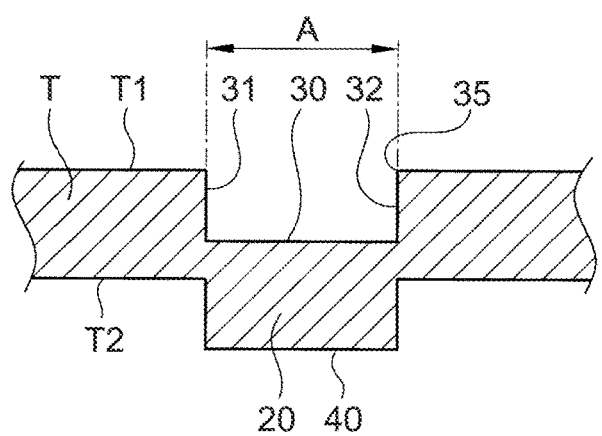
FIG. 6 is an enlarged view of the formed crimped portion.

Also, the workpiece T is plastic deformed by the crimping punch 111 and the crimping die 115 at the location where the workpiece T is sandwiched by the crimping punch 111 and the crimping die 115. As a result, the crimped portion 20 having the recessed portion 30 on the first surface T1 side and the protruding portion 40 on the second surface T2 side is formed, as shown in FIG. 6. The distance A between the side surfaces 31 and 32 of the recessed portion 30 of the formed crimped portion 20 is shown in FIG. 6.

Next, the portion of the workpiece T where the crimped portion 20 is formed reaches the position of the stacking portion 120 by the workpiece T being conveyed. Then at the position of the stacking portion 120, a stacking process to punch the workpiece T with the outer shape punch 130 and the outer shape die 140, and stack the punched portion is performed.

Figure 7:
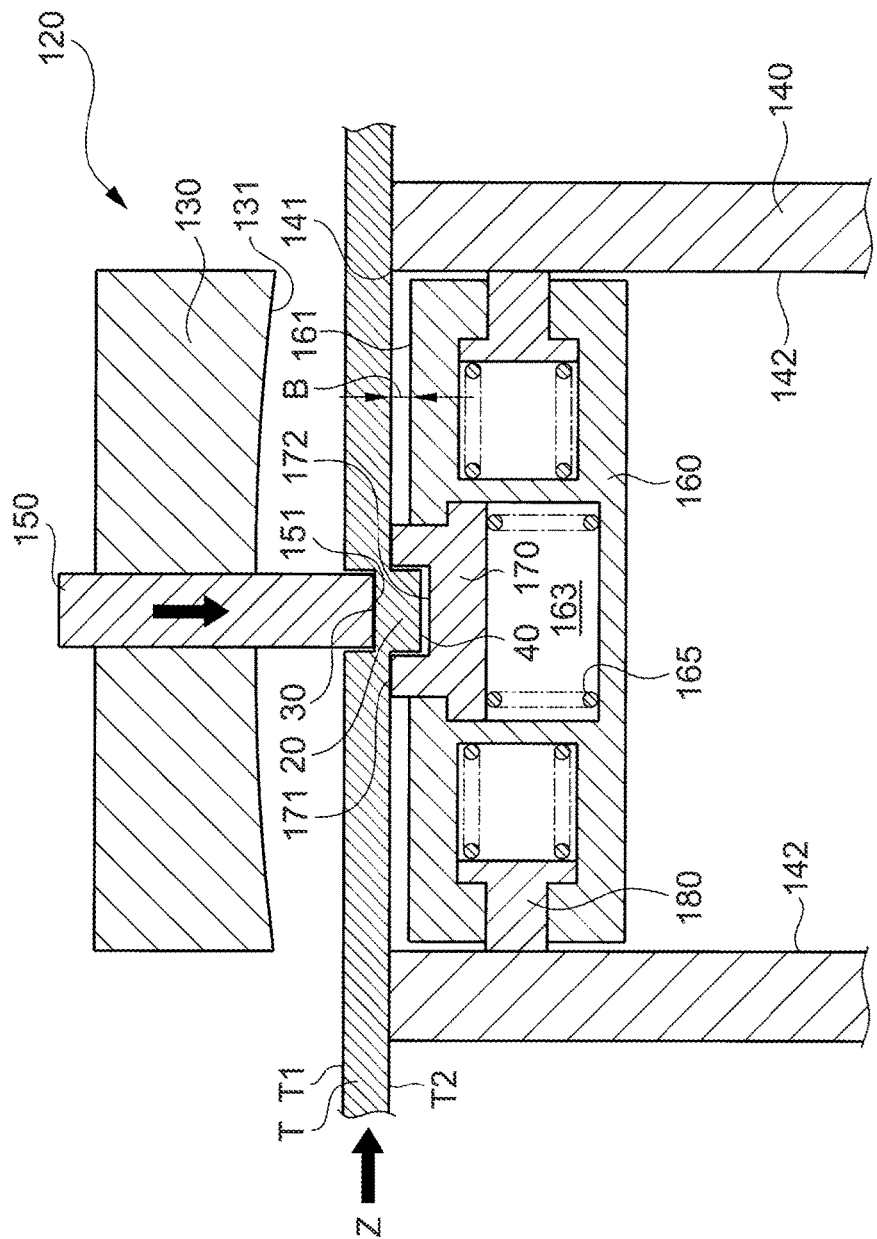
FIG. 7 is a view illustrating the positioning with a stacking portion according to the first example embodiment.

That is, at the position of the stacking portion 120, first the positioning portion 150 is moved downward, and the tip end 151 of the positioning portion 150 is inserted into the recessed portion 30 of the crimped portion 20 of the workpiece T, as shown in FIG. 7. As a result, the crimped portion 20 of the workpiece T is positioned in the in-plane direction of the workpiece T.

Also, as shown in FIG. 7, the protruding portion 40 of the crimped portion 20 is inserted into the recessed portion 172 of the thrusting portion 170. Then, the second surface T2 of the workpiece T contacts the thrusting surface 171 of the thrusting portion 170. The positioning accuracy of the workpiece T by the positioning portion 150 does not necessarily have to be high. That is, there may be a slight gap between the recessed portion 30 of the crimped portion 20 and the tip end 151 of the positioning portion 150 that is inserted into this recessed portion 30.

Figure 8:
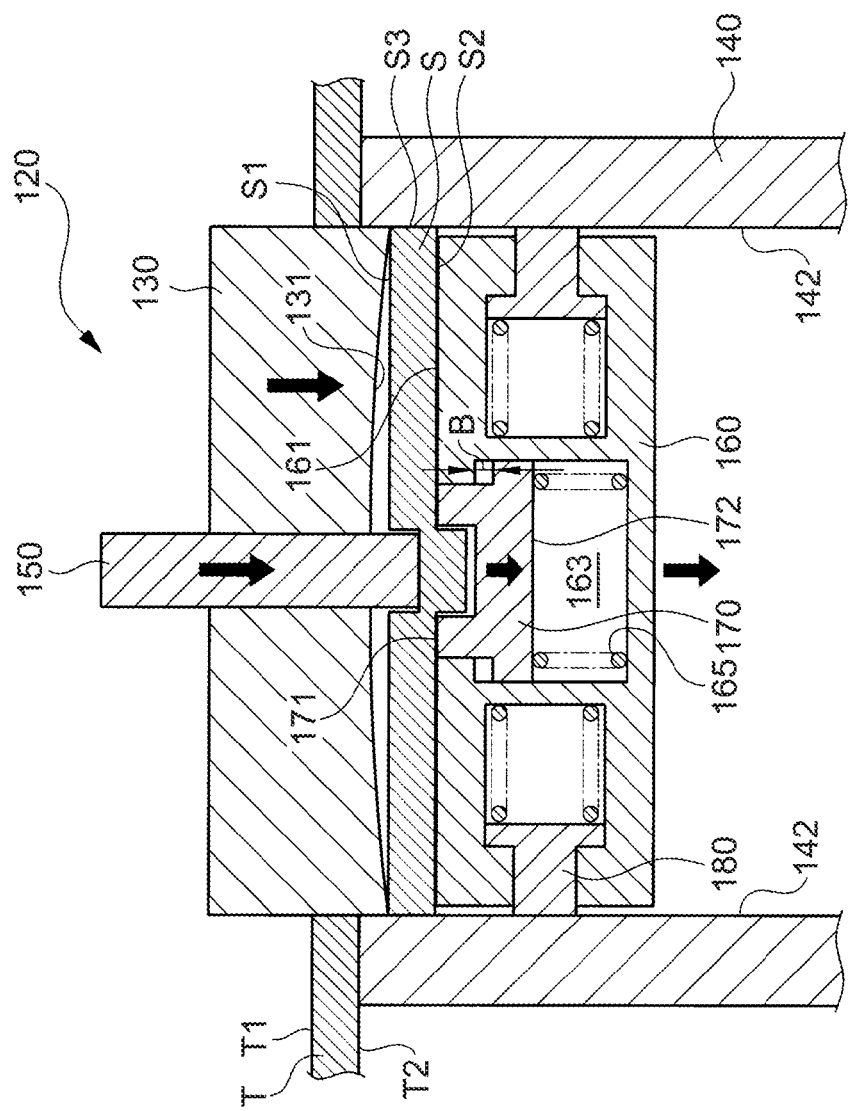
FIG. 8 is a view illustrating punching with the stacking portion according to the example embodiment.

Next, the outer shape punch 130 is moved downward, as shown in FIG. 8. A down end of the outer shape punch 130 is shown in FIG. 8. The lower surface 131 of the outer shape punch 130 at the down end enters the inside of the outer shape die 140. The workpiece T is punched by this movement of the outer shape punch 130.

That is, the portion of the workpiece T that is punched by the movement of the outer shape punch 130 becomes the sheet S having the outer shape S3 as shown in FIG. 8. Thus, punching that forms the outer shape S3 of the sheet S is performed. Also, the second surface S2 of the sheet S is pushed against the upper surface 161 of the sliding portion 160 by the outer shape punch 130 moving downward in FIG. 8.

Further, the sliding portion 160 that receives the pressing force of the outer shape punch 130 via the sheet S moves downward by the amount that it is pressed on by the outer shape punch 130. This is because the holding force of the sliding portion 160 by the holding portion 180 is small enough to allow the sliding portion 160 to move by the pressing force of the outer shape punch 130, as described above.

Also, the second surface S2 of the sheet S is also pressed against the thrusting surface 171 of the thrusting portion 170 by the outer shape punch 130 moving downward in FIG. 8. Also, the pressing force of the outer shape punch 130 causes the thrusting portion 170 to retract so that the thrusting surface 171 is in the same plane as the upper surface 161 of the sliding portion 160. That is, the thrusting portion 170 moves downward by the amount equal to the length B that the thrusting surface 171 protruded from the upper surface 161 of the sliding portion 160.

Figure 9:
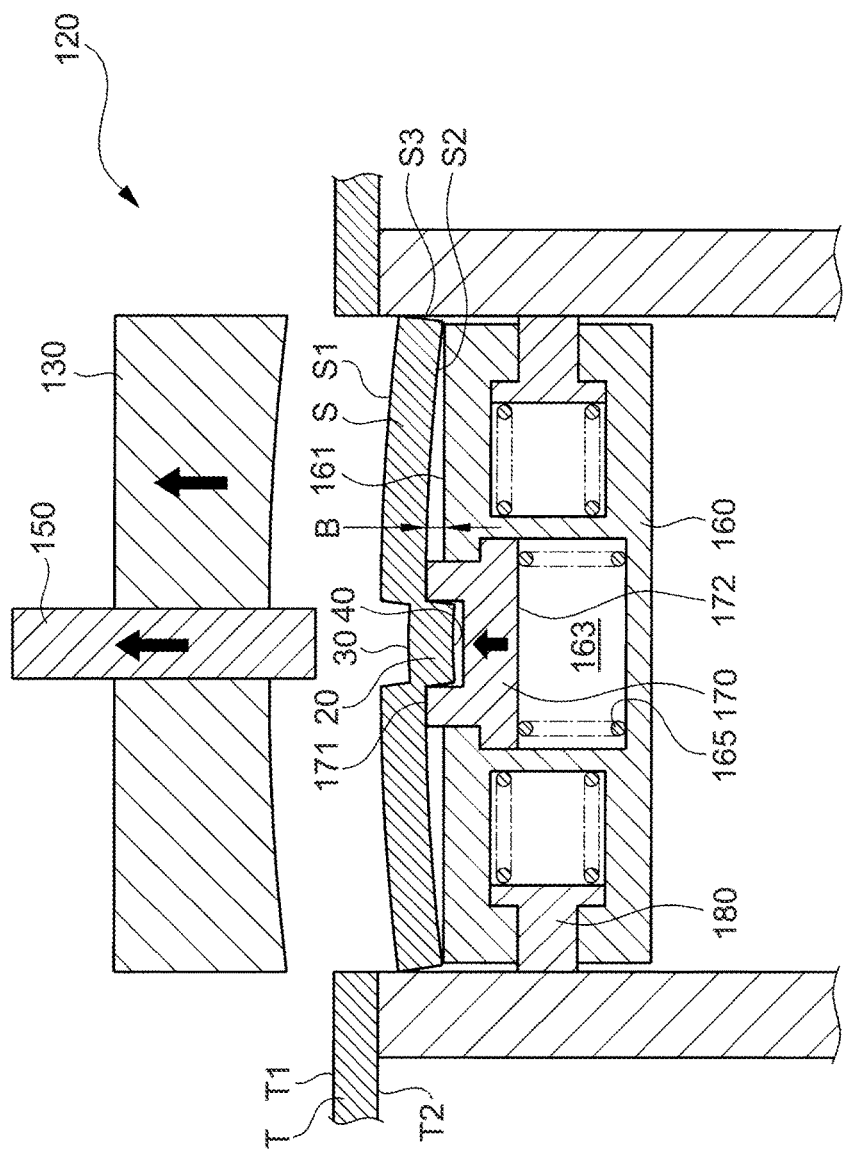
FIG. 9 is a view illustrating the curved state of a magnetic steel sheet after punching with the stacking portion according to the example embodiment.

Continuing on, the outer shape punch 130 that performed the punching is moved upward, as shown in FIG. 9. The positioning portion 150 is also moved upward together with the outer shape punch 130. Therefore, in FIG. 9, the pressing force applied from the outer shape punch 130 to the thrusting portion 170 is released. Consequently, the thrusting portion 170 moves upward from the urging force of the compression spring 165.

Accordingly, in FIG. 9, the portion around the protruding portion 40 of the crimped portion 20 of the second surface S2 of the sheet S is pushed upward by the thrusting portion 170 that moves upward. More specifically, the portion around the protruding portion 40 of the crimped portion 20 of the second surface S2 of the sheet S is pushed upward by the thrusting surface 171 of the thrusting portion 170, by the length B from the upper surface 161 of the sliding portion 160. The outer shape S3 of the end portion of the sheet S in the left-right direction shown in FIG. 9 is kept in contact with the upper surface 161 of the sliding portion 160 by friction between the outer shape S3 of the end portion of the sheet S and the inner wall surface 142 of the outer shape die 140.

As a result, the sheet S inside the outer shape die 140 is curved with the first surface S1 bulging out, as shown in FIG. 9. In this example embodiment, the opening 35 of the recessed portion 30 of the crimped portion 20 of the first surface S1 of the sheet S is curved so as to bulge out more than any other portion. The extent of the curvature of the sheet S in this example embodiment is within the range of elastic deformation.

Figure 10:
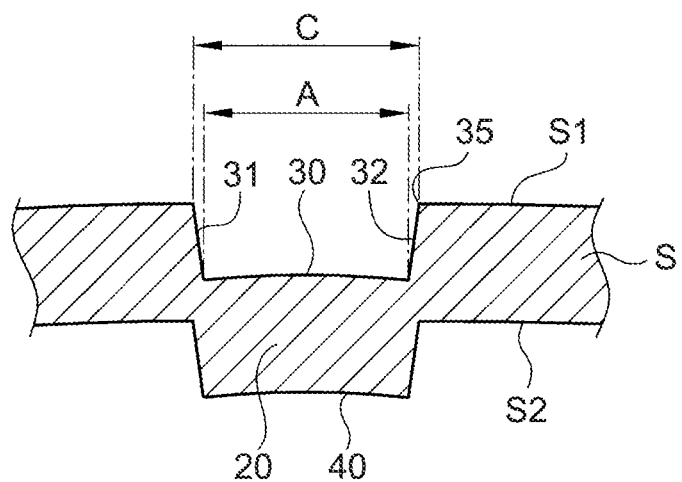
FIG. 10 is an enlarged view of the curved state of the magnetic steel sheet at the crimped portion.

FIG. 10 is a view of the crimped portion 20 in a state pressed on by the thrusting portion 170. As shown in FIG. 10, when the crimped portion 20 is pressed on by the thrusting portion 170, the opening 35 of the recessed portion 30 of the crimped portion 20 is open wider in the left-right direction more than in the state shown in FIG. 4. That is, a distance C between the side surfaces 31 and 32 of the opening 35 of the recessed portion 30 of the crimped portion 20 is greater than a distance A between the side surfaces 31 and 32 at the bottom surface of the recessed portion 30. Therefore, the side surfaces 31 and 32 of the recessed portion 30 of the crimped portion 20 are inclined surfaces that are inclined in a direction approaching each other farther away from the first surface S1.

Figure 11:
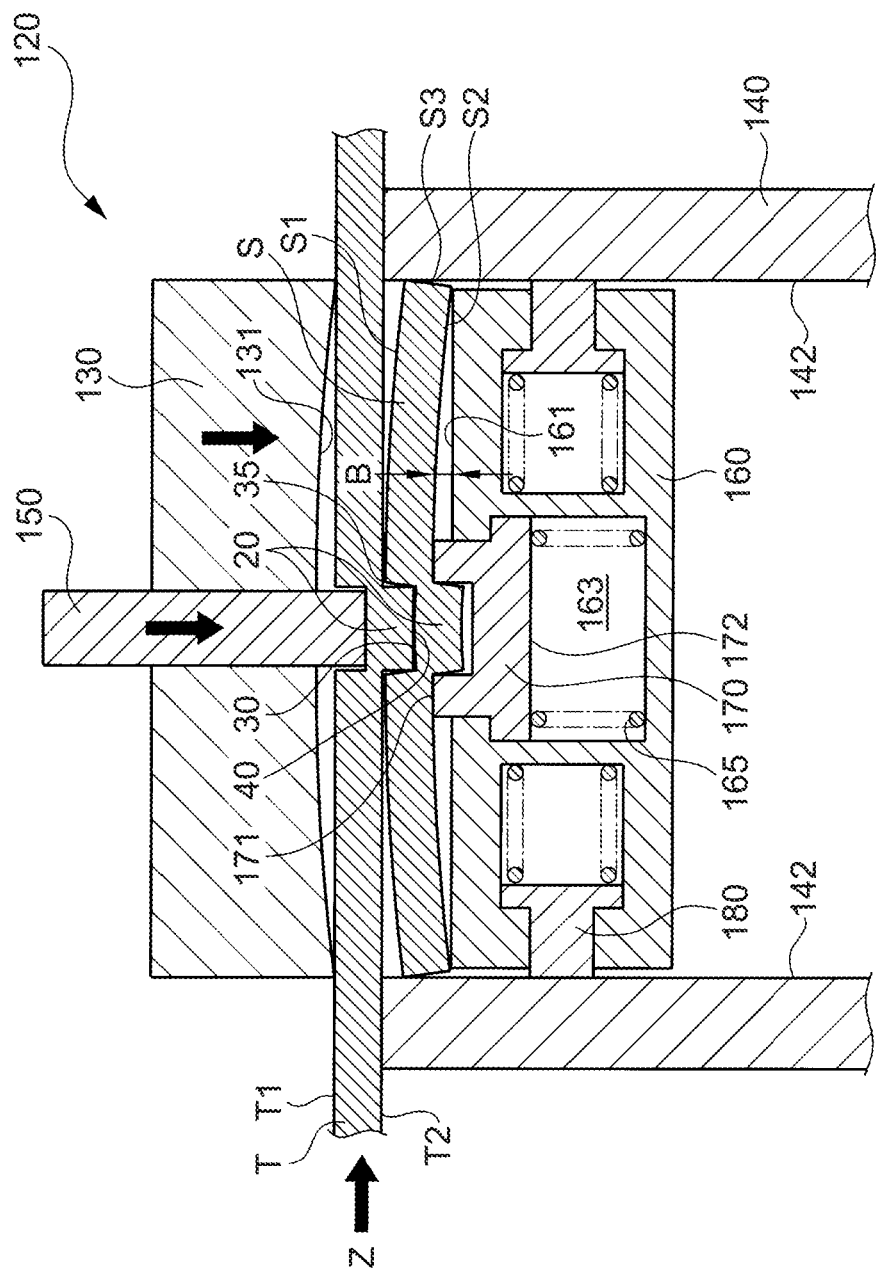
FIG. 11 is a view illustrating a second stacked sheet at the stacking portion according to the first example embodiment.

Then, the workpiece T is fed in the direction of arrow Z while the sheet S is held inside the outer shape die 140 while being curved such that the first surface S1 side bulges out. FIG. 11 is a view of a state in which the portion of the workpiece T where the crimped portion 20 is formed has reached the position of the stacking portion 120 by the workpiece T being conveyed. Also, in FIG. 11, the positioning portion 150 is shown in a state in which it has been moved downward, and moreover, the outer shape punch 130 is shown in a state in which it has been moved downward to a position contacting the first surface T1 of the workpiece T.

After the state shown in FIG. 11, punching of the next sheet S is performed by moving the outer shape punch 130 further downward. That is, in FIG. 11, the portion of the workpiece T that will become the sheet S by punching faces the first surface S1 of the sheet S that is held inside the outer shape die 140, with the second surface T2. Also, after the state shown in FIG. 11, the sheet S that has been punched from the workpiece T is stacked with the second surface S2 on top of the first surface S1 of the sheet S held inside the outer shape die 140.

Moreover, in FIG. 11, the protruding portion 40 of the workpiece T is inserted into the recessed portion 30 of the sheet S inside the outer shape die 140. That is, in this example embodiment, the protruding portion 40 of the workpiece T is inserted into the recessed portion 30 while the opening 35 of the recessed portion 30 of the sheet S inside the outer shape die 140 is open wide. Therefore, in this example embodiment, the protruding portion 40 of the workpiece T is able to be reliably inserted into the recessed portion 30 of the sheet S inside the outer shape die 140 through the opening 35 of this recessed portion 30.

Also, after the protruding portion 40 of the workpiece T is inserted into the recessed portion 30 of the sheet S inside the outer shape die 140 through the opening 35 of that recessed portion 30, the protruding portion 40 of the workpiece T is inserted deep into the recessed portion 30 along the side surfaces 31 and 32 of the recessed portion 30. Therefore, the protruding portion 40 of the crimped portion 20 of the workpiece T is accurately inserted into the recessed portion 30 of the crimped portion 20 of the sheet S inside the outer shape die 140. Thus, in this example embodiment, the punched sheet S and the sheet S inside the outer shape die 140 are able to be stacked, as well as reliably joined together by the recessed portion 30 and the protruding portion 40 of the crimped portions 20 of these sheets S.

Also, in this example embodiment, the protruding portion 40 of the crimped portion 20 of the workpiece T is inserted into the recessed portion 30 of the crimped portion 20 of the sheet S inside the outer shape die 140 before punching of the workpiece T is performed, as shown in FIG. 11. Also, punching of the workpiece T is performed in a state with the protruding portion 40 of the crimped portion 20 of the workpiece T inserted into the recessed portion 30 of the crimped portion 20 of the sheet S inside the outer shape die 140. As a result, the sheet S that has been punched from the workpiece T and the sheet S that is inside the outer shape die 140 are able to be stacked while appropriately positioned. That is, punching in this example embodiment is preferably performed while at least the tip end of the protruding portion 40 of the crimped portion 20 of the workpiece T inserted into the recessed portion 30 of the crimped portion 20 of the sheet S inside the outer shape die 140.

Figure 12:
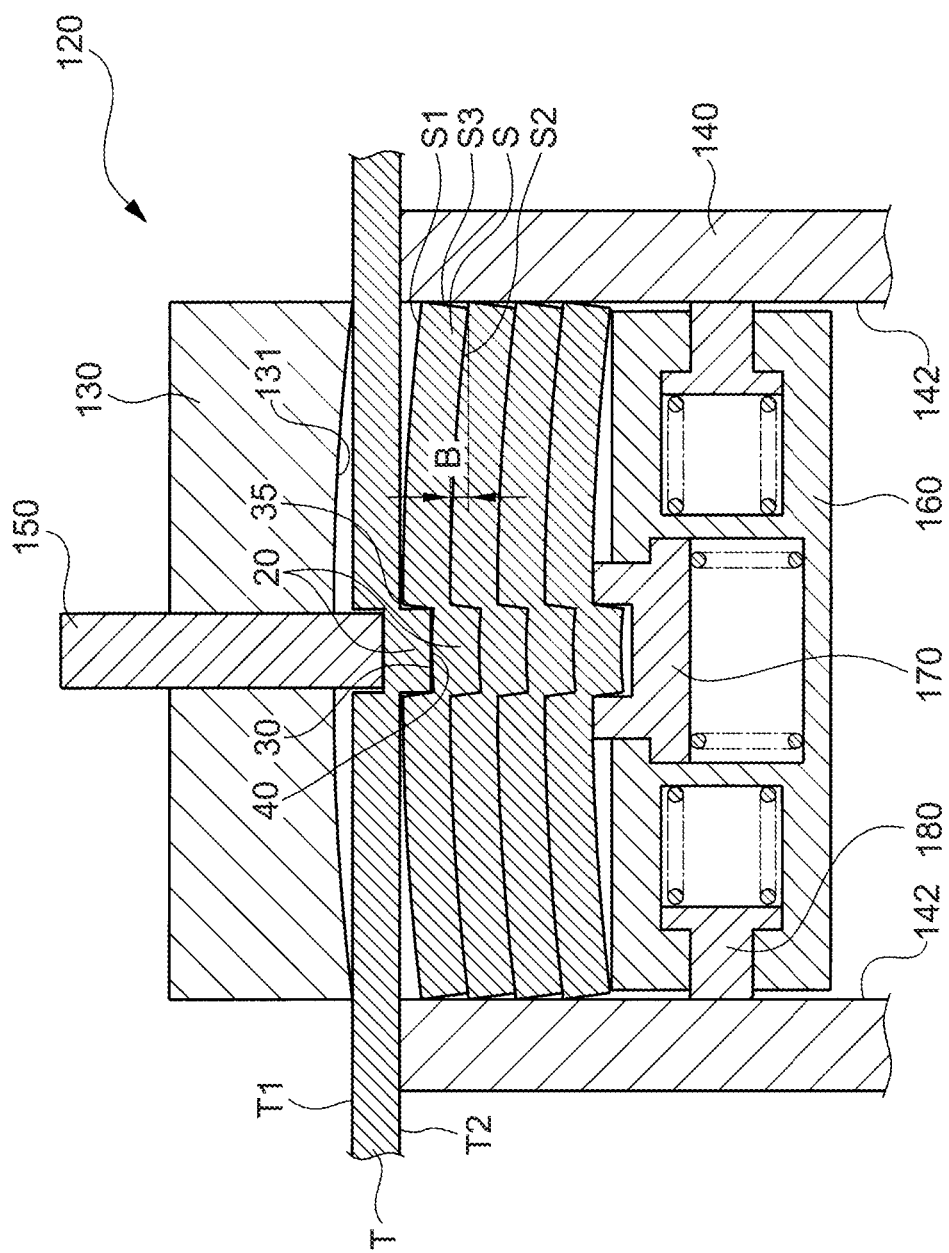
FIG. 12 is a view illustrating third and subsequent stacked sheets at the stacking portion according to the first example embodiment.

Also, the sheet S that has been punched from the workpiece T is stacked on top of the sheet S held inside the outer shape die 140 first, in a shape that matches the shape of the held sheet S. This is because the lower surface 131 of the outer shape punch 130 has a recessed shape that follows the shape of the sheet S held inside the outer shape die 140. That is, the second and subsequent sheets S are also held inside the outer shape die 140 while curving such that the first surface S1 side of each bulges out, just like the first sheet S. FIG. 12 is a view showing a state after FIG. 11, in which a plurality of the sheets S are stacked. As shown in FIG. 12, all of the sheets S held inside the outer shape die 140 are curved such that the first surface S1 side of each bulges out.

Also, in FIG. 12 as well, the protruding portion 40 of the crimped portion 20 of the punched portion of the workpiece T is appropriately inserted in the recessed portion 30 of the sheet S that is stacked on the very top inside the outer shape die 140. As a result, the punched sheet S after the state in FIG. 12 and the very top sheet S inside the outer shape die 140 are able to be stacked, as well as reliably joined together by the recessed portion 30 and the protruding portion 40 of the crimped portions 20 of these sheets S.

Also in FIG. 12, the protruding portion 40 of the crimped portion 20 of the workpiece T is inserted into the recessed portion 30 of the crimped portion 20 of the sheet S inside the outer shape die 140 before punching is performed. Therefore, the sheet S that is punched from the workpiece T and the sheet S that is inside the outer shape die 140 are able to be stacked while appropriately positioned.

As described above with reference to FIG. 3, the recessed portion 30 of the crimped portion 20 in this example embodiment is formed such that in the Y-Y cross-section, the side surfaces 33 and 34 are inclined surfaces that are inclined in a direction approaching each other farther away from the first surface S1. Therefore, the opening 35 of the recessed portion 30 of the crimped portion 20 in the Y-Y cross-section is already open wide. Also, the side surfaces 43 and 44 of the protruding portion 40 of the crimped portion 20 in the Y-Y cross-section are also formed as inclined surfaces that are inclined in a direction approaching each other farther away from the second surface S2. Therefore, the sheet S does not have to be made to curve so that the first surface S1 bulges out in the Y-Y cross-section.

Also, the rotor core 10 in which a predetermined number of sheets S are suitably joined by the crimped portions 20, inside the outer shape die 140, by stacking the sheets S stacked in the stacking portion 120, is able to be manufactured. Also, a rotating shaft assembly process in which a rotating shaft is assembled in the rotating shaft assembly hole 11 of the rotor core 10 and the like is performed in a post process on the rotor core 10 that has been removed from inside the outer shape die 140. Consequently, the rotor is manufactured. The rotor core 10 that has been removed from inside the outer shape die 140 returns from the state in which the first surface S1 side of the sheet S is curved so as to bulge out, to its normal state in which it is no longer curved. This is because, in this example embodiment, the sheet S had a curved shape due to elastic deformation.

As described in detail above, in the manufacturing method of the rotor core 10 according to this example embodiment, first, the crimped portion forming process that forms the crimped portion 20 having the recessed portion 30 on the first surface T1 side of the workpiece T and the protruding portion 40 on the second surface T2 side of the workpiece T is performed. Next, the stacking process in which the sheet S is stacked while the outer shape S3 of the sheet S is formed by punching from the workpiece T is performed. In the stacking process, the second surface S2 of the punched sheet 8 is stacked on the first surface S1 of the sheet S that is held, in a state in which the first surface S1 is curved so as to bulge out, inside the outer shape die 140.

The opening 35 of the recessed portion 30 of the crimped portion 20 of the sheet S inside the outer shape die 140 is open wide because the first surface S1 of this sheet S is curved so as to bulge out. Thus, the protruding portion 40 of the crimped portion 20 of the punched sheet S is able to be inserted into the recessed portion 30 in which the opening 35 is open wide, while following the side surfaces 31 and 32 of this recessed portion 30. As a result, a manufacturing method of a core for a rotary electric machine that enables two sheets in which crimped portions have been formed beforehand to be stacked, as well as reliably joined by the crimped portions, is realized.

The example embodiments are merely examples and do not limit the present specification in any way. Accordingly, the present specification may naturally be improved or modified without departing from the scope thereof. That is, in the example embodiment described above, punching of the workpiece T is performed after the protruding portion 40 of the crimped portion 20 of the workpiece T is inserted into the recessed portion 30 of the crimped portion 20 of the sheet S inside the outer shape die 140. However, punching of the workpiece T may also be performed first, and then the protruding portion 40 of the crimped portion 20 of the punched sheet S may be inserted into the recessed portion 30 of the crimped portion 20 of the sheet S that is held curved inside the outer shape die 140. Also, for example, the outer shape S3 of the punched sheet S is naturally not limited to a circular shape as shown in FIG. 1. Also, for example, other machining such as that of the through-hole may also be applied to the sheet S. Also, for example, in the example embodiment described above, an example of a rotor core is described in detail, but the present specification may naturally also be applied to the manufacturing method of a stator core in which a plurality of sheets are joined together by crimping.

Second Example Embodiment

Next, a second example embodiment of the present specification will be described. In this example embodiment as well, the rotor core 10 that is manufactured is similar to that of the first example embodiment. In this example embodiment, the rotor core 10 is manufactured while feeding the workpiece T in a state in which the front and back sides (i.e., the top and bottom) are reversed from that in the first example embodiment.

Figure 13:
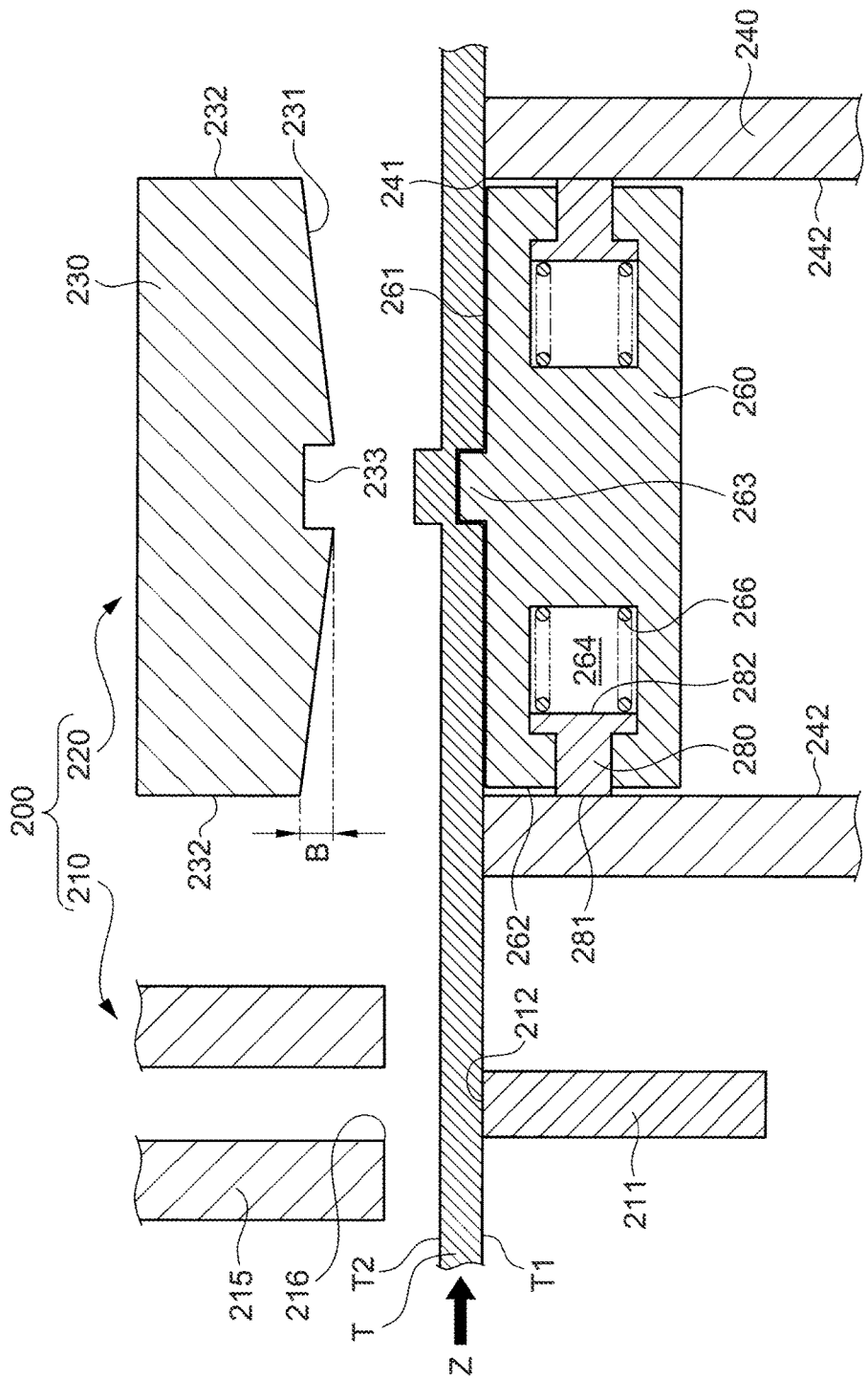
FIG. 13 is a view illustrating a rotor core manufacturing apparatus according to a second example embodiment of the present specification.

FIG. 13 is a view of a rotor core manufacturing apparatus 200 according to this second example embodiment. As shown in FIG. 13, the rotor core manufacturing apparatus 200 includes a crimped portion forming portion 210 that performs a crimped portion forming process, and a stacking portion 220 that performs a stacking process.

The crimped portion forming portion 210 in this example embodiment is able to form the crimped portion 20 of the sheet S, similar to the first example embodiment. Also, the stacking portion 220 is also able to manufacture the rotor core 10 by stacking a plurality of the sheets S one by one, similar to the first example embodiment. Also, when stacking the sheets S, the stacking portion 220 joins two sheets S that have been stacked with the first surface S1 and the second surface 82 facing each other, using the crimped portions 20 of these sheets S. Moreover, the stacking portion 220 of this example embodiment also performs punching to form the outer shape S3 of the sheet S.

Also, FIG. 13 is a view of the workpiece T that has been fed into the rotor core manufacturing apparatus 200. In this example embodiment as well, the workpiece T is fed into the rotor core manufacturing apparatus 200 from left to right as indicated by arrow Z. However, the workpiece T is fed into the rotor core manufacturing apparatus 200 with the second surface T2 facing up and the first surface T1 facing down.

The crimped portion forming portion 210 includes a crimping punch 211 and a crimping die 215, as shown in FIG. 13. In this example embodiment as well, the crimping punch 211 is arranged on the first surface T1 side of the workpiece T, and the crimping die 215 is arranged on the second surface T2 side of the workpiece T. However, in this example embodiment, the front and back sides (i.e., the top and bottom) of the workpiece T are reversed from that in the first example embodiment, on the crimping punch 211 is arranged below the workpiece T and the crimping die 215 is arranged above the workpiece T. Also, the crimping die 215 in this example embodiment is able to move downward toward the crimping punch 211.

Also, in this example embodiment as well, a tip end 212 of the crimping punch 211 has a shape corresponding to the recessed portion 30 of the crimped portion 20 of the sheet S. An opening 216 of the crimping die 215 has a shape corresponding to the protruding portion 40 of the crimped portion 20 of the sheet S. Further, two pairs of the crimping punch 211 and the crimping die 215 are arranged at the interval P of the crimped portions 20 of the sheet S, in the depth direction in FIG. 13.

The stacking portion 220 includes an outer shape punch 230, an outer shape die 240, and a sliding portion 260. In this example embodiment as well, the outer shape punch 230 and the outer shape die 240 are able to manufacture the sheet S from the workpiece T by punching.

In this example embodiment, the outer shape punch 230 is arranged on the second surface T2 side of the workpiece T, and the outer shape die 240 is arranged on the first surface T1 side of the workpiece T. In this example embodiment as well, the outer shape punch 230 is able to move downward toward the outer shape die 240.

The outer shape punch 230 is arranged with a lower surface 231 toward the second surface T2 of the workpiece T. A recessed portion 233 is formed in the center of the lower surface 231 of the outer shape punch 230 of this example embodiment. The recessed portion 233 has a shape corresponding to the protruding portion 40 of the crimped portion 20. Also, the recessed portion 233 of the outer shape punch 230 is provided two by two at the interval Pin the depth direction in FIG. 13.

Also, a side surface 232 of the outer shape punch 230 has the same shape as the outer shape S3 of the sheet S. Further, the lower surface 231 of the outer shape punch 230 has a protruding shape in which the center protrudes out farther than both the left and right end sides in FIG. 13. Also, the position of an opening of the recessed portion 233 in the center of the lower surface 231 of the outer shape punch 230 protrudes out by the length B, as shown in FIG. 13, from both the left and right end sides.

The outer shape die 240 is arranged with an opening 241 toward the first surface T1 of the workpiece T. An inner wall surface 242 of the outer shape die 240 has a shape corresponding to the outer shape S3 of the sheet S.

The sliding portion 260 is provided inside the outer shape die 240. A protruding portion 263 is formed in the center of an upper surface 261 of the sliding portion 260. The protruding portion 263 has a shape corresponding to the recessed portion 30 of the crimped portion 20. Also, the protruding portion 263 of the upper surface 261 of the sliding portion 260 is provided two by two at the interval P in the depth direction in FIG. 13.

Also, in this example embodiment as well, a plurality of holding portions 280 are provided in a radial fashion on the sliding portion 260 when viewed from above. For example, four of the holding portions 280 may be provided. Each of these holding portions 280 is housed, in a housing hole 264 formed open on a side surface 262 of the sliding portion 260, in a state in which an inside surface 282 on the inside of the housing hole 264 receives urging force from a compression spring 266. This urging force from the compression spring 266 causes a tip end 281 of the holding portion 280 to protrude farther outward than the side surface 262 of the sliding portion 260.

Also, the tip end 281 of the holding portion 280 protrudes from the side surface 262 of the sliding portion 260, and is pushed against the inner wall surface 242 of the outer shape die 240. The sliding portion 260 is held inside the outer shape die 240 by this pressing force of the holding portion 280.

In this example embodiment as well, the holding force that pushes the holding portion 280 against the inner wall surface 242 and holds the sliding portion 260 inside the outer shape die 240 from the urging force of the compression spring 266 is not strong enough to completely stop the movement of the outer shape punch 230. That is, the sliding portion 260 moves by the pressing force received from the outer shape punch 230 when pressed on by the outer shape punch 230.

Next, a manufacturing method of the rotor core 10 by the foregoing rotor core manufacturing apparatus 200 will be described with reference to FIGS. 13 to 17. FIGS. 13 to 17 are also views of cross-sections of the workpiece T and the sheet S corresponding to a cross-section taken along line Z-Z shown in FIG. 1. As shown in FIG. 13, the workpiece T is fed into the rotor core manufacturing apparatus 200 in the direction of arrow Z, by being unrolled from roll material or the like. The through-hole 21 in the sheet S is formed in the workpiece T before reaching the crimped portion forming portion 210.

Figure 14:
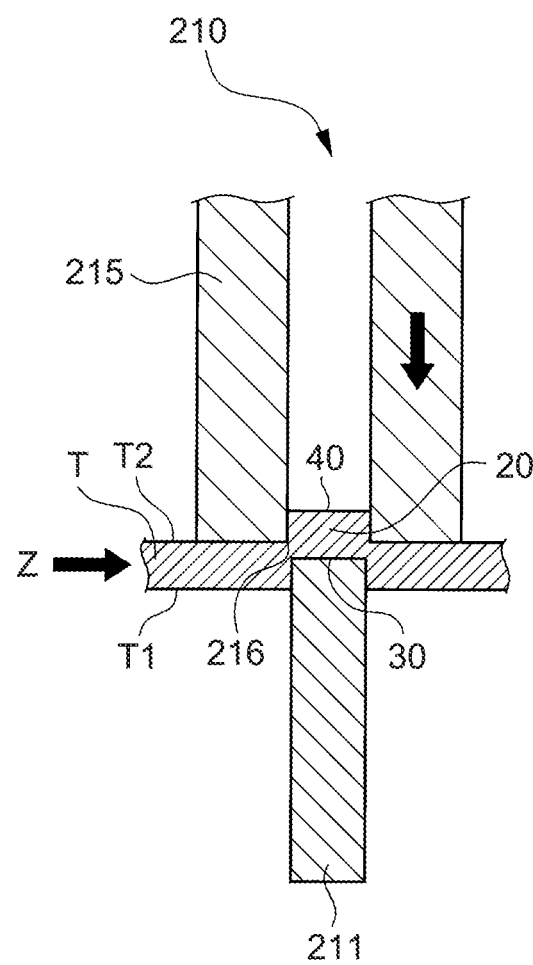
FIG. 14 is a view illustrating the formation of a crimped portion formed by a crimped portion forming portion according to the second example embodiment.

Then, at the position of the crimped portion forming portion 210, the workpiece T is sandwiched by the crimping die 215 that has moved toward the second surface T2 and the crimping punch 211 that is arranged on the first surface T1 side, as shown in FIG. 14. Also, the workpiece T is plastic deformed by the crimping punch 211 and the crimping die 215, at the location where the workpiece T is sandwiched by the crimping punch 211 and the crimping die 215. As a result, in this example embodiment as well, the crimped portion 20 having the recessed portion 30 on the first surface T1 side and the protruding portion 40 on the second surface T2 side is formed, as shown in FIG. 6.

Next, the portion of the workpiece T where the crimped portion 20 is formed reaches the position of the stacking portion 220 by the workpiece T being conveyed. Then at the position of the stacking portion 220, a stacking process to punch the workpiece T with the outer shape punch 230 and the outer shape die 240 and stack the punched portion is performed.

Figure 15:
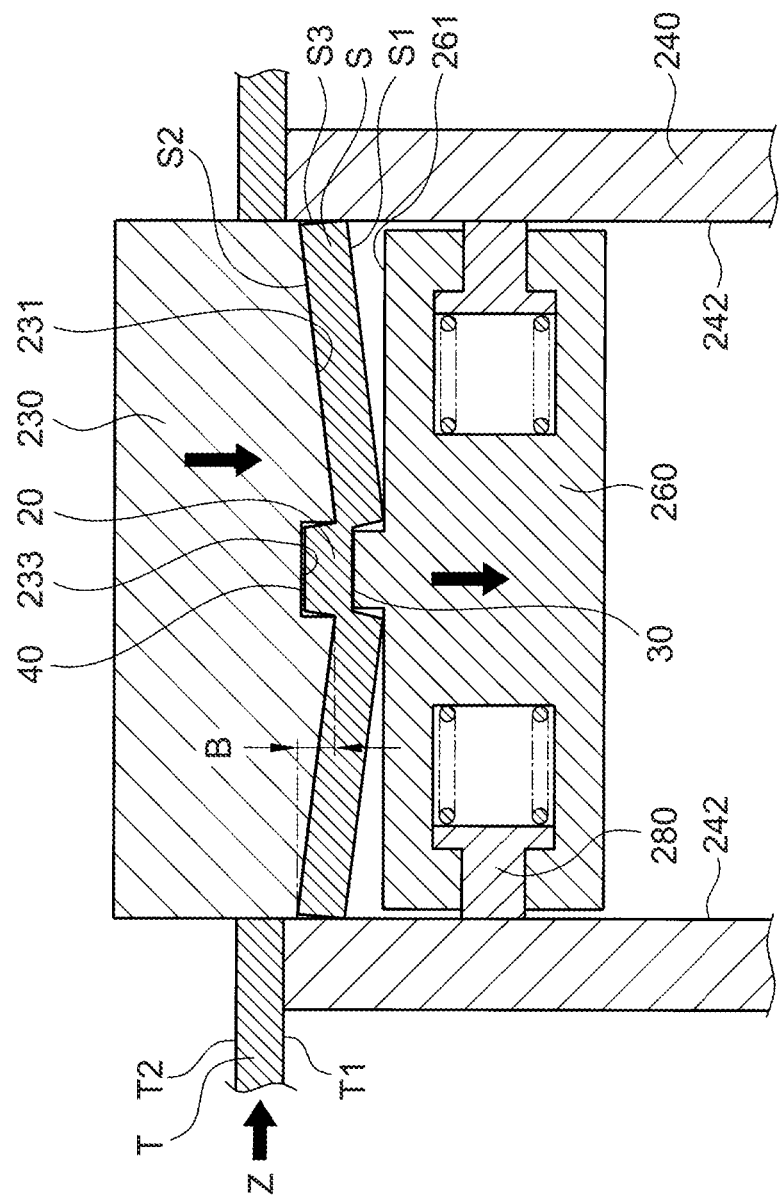
FIG. 15 is a view illustrating punching with a stacking portion according to the second example embodiment.

That is, the outer shape punch 230 is moved downward, as shown in FIG. 15. A down end of the outer shape punch 230 is shown in FIG. 15. The lower surface 231 of the outer shape punch 230 at the down end enters the inside of the outer shape die 240. The workpiece T is punched by this movement of the outer shape punch 230.

That is, the portion of the workpiece T that is punched by the movement of the outer shape punch 230 becomes the sheet S having the outer shape S3 as shown in FIG. 15. Thus, punching that forms the outer shape S3 of the sheet S is performed. Also, the sheet S has a shape that follows the lower surface 231 of the outer shape punch 230 having a shape in which the center bulges out.

That is, the sheet S is punched while being curved such that the first surface S1 side of the sheet S bulges out, by the second surface S2 being pressed on by the lower surface 231 of the outer shape punch 230. The sheet S curves such that the opening 35 of the recessed portion 30 of the crimped portion 20 on the first surface S1 bulges out more than any other portion. As a result, in this example embodiment, when punching the sheet S, the opening 35 of the recessed portion 30 of the crimped portion 20 on the side where punching is performed is able to be made into a shape that is open wide in the left-right direction, as shown in FIG. 10. The extent of the curvature of the sheet S in this example embodiment is also within the range of elastic deformation.

Also, the first surface S1 of the punched sheet S is pressed against the upper surface 261 of the sliding portion 260. Then, the sliding portion 260 that has received the pressing force of the outer shape punch 230 via the sheet S moves downward by the amount that it is pressed on by the outer shape punch 230.

Figure 16:
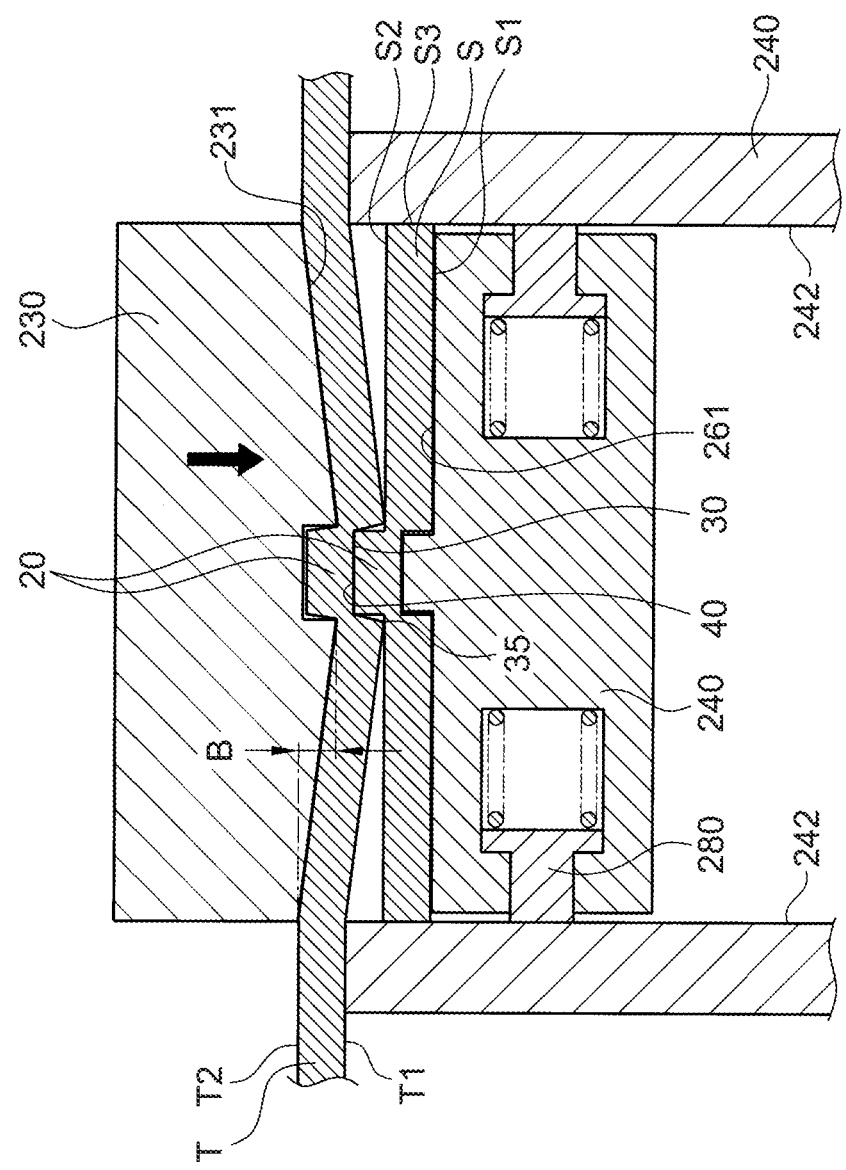
FIG. 16 is a view illustrating a second stacked sheet at the stacking portion according to the first example embodiment.

Continuing on, the punching of the next sheet S is performed. FIG. 16 is a view of the outer shape punch 230 that has performed punching in FIG. 15, after this outer shape punch 230 has been moved upward and the workpiece T has been fed in the direction of arrow Z. As a result, the portion of the workpiece T where the crimped portion 20 is formed reaches the position of the stacking portion 220 by the workpiece T being conveyed. Moreover, FIG. 16 shows a state in which the outer shape punch 230 is moving downward and is pressing on the second surface T2 of the workpiece T. The state shown in FIG. 16 is one in which the outer shape punch 230 has not yet moved to the down end. Therefore, the state shown in FIG. 16 is a state before punching of the workpiece T is complete.

As shown in FIG. 16, the portion of the workpiece T that will be the sheet S from punching faces the second surface 82 of the sheet S that is held inside the outer shape die 240, with the first surface T1. After the state shown in FIG. 16, the sheet S that has been punched from the workpiece T is stacked with the first surface S1 on top of the second surface S2 of the sheet S that is held inside the outer shape die 240.

Also, as shown in FIG. 16, the workpiece T is pressed on by the lower surface 231 of the outer shape punch 230 that has moved downward, and consequently curves such that the first surface T1 side bulges out. Also, the protruding portion 40 of the crimped portion 20 of the sheet S held inside the outer shape die 240 is inserted inside the recessed portion 30 of the crimped portion 20 of the workpiece T that is being pressed on.

That is, the protruding portion 40 of the crimped portion 20 of the sheet S inside the outer shape die 240 is inserted into the recessed portion 30 while the opening 35 of the workpiece T is open wide. Therefore, in this example embodiment as well, the protruding portion 40 of the sheet S inside the outer shape die 240 is able to be reliably inserted into the recessed portion 30 of the workpiece T through the opening 35 of this recessed portion 30.

Also, in this example embodiment as well, the protruding portion 40 of the sheet S inside the outer shape die 240 is inserted deep into the recessed portion 30 along the side surfaces 31 and 32 of the recessed portion 30 of the workpiece T. Therefore, the protruding portion 40 of the crimped portion 20 of the sheet S inside the outer shape die 240 is suitably inserted into the recessed portion 30 of the crimped portion 20 of the workpiece T. Thus, the protruding portion 40 of the crimped portion 20 of the sheet S inside the outer shape die 240 is accurately inserted into the recessed portion 30 of the crimped portion 20 of the workpiece T. As a result, in this example embodiment, the punched sheet S and the sheet S inside the outer shape die 240 are able to be stacked, as well as reliably joined together by the recessed portion 30 and the protruding portion 40 of the crimped portions 20 of these sheets S.

Also, in this example embodiment, the protruding portion 40 of the crimped portion 20 of the sheet S inside the outer shape die 240 is inserted into the recessed portion 30 of the crimped portion 20 of the workpiece T before punching of the workpiece T is performed, as shown in FIG. 16. Also, punching of the workpiece T is performed in a state with the protruding portion 40 of the crimped portion 20 of the sheet S inside the outer shape die 240 inserted into the recessed portion 30 of the crimped portion 20 of the workpiece T. As a result, the sheet S that has been punched from the workpiece T and the sheet S that is inside the outer shape die 240 are able to be stacked while appropriately positioned. That is, the punching in this example embodiment is preferably performed with at least the tip end of the protruding portion 40 of the crimped portion 20 of the sheet S inside the outer shape die 240 inserted into the recessed portion 30 of the crimped portion 20 of the workpiece T.

Also, the sheet S that has been punched from the workpiece T is stacked on top of the sheet S held inside the outer shape die 240 first. Also, FIG. 17 is a view showing a state after FIG. 16, in which a plurality of the sheets S are stacked.

In FIG. 17 as well, the workpiece T is pressed on by the lower surface 231 of the outer shape punch 230 that has moved downward, and consequently curves such that the first surface T1 side bulges out. Also, the protruding portion 40 of the crimped portion 20 of the uppermost sheet S held inside the outer shape die 240 is inserted inside the recessed portion 30 of the crimped portion 20 of the workpiece T that is being pressed on. As a result, in this example embodiment, the punched sheet S after the state shown in FIG. 17 and the sheet S inside the outer shape die 240 are able to be stacked, as well as reliably joined together by the recessed portion 30 and the protruding portion 40 of the crimped portions 20 of these sheets S.

Also, in FIG. 17 as well, the protruding portion 40 of the crimped portion 20 of the uppermost sheet S inside the outer shape die 240 is inserted into the recessed portion 30 of the crimped portion 20 of the workpiece T before the workpiece T is punched. Therefore, the sheet S that has been punched from the workpiece T and the uppermost sheet S that is inside the outer shape die 240 are able to be stacked while positioned appropriately.

As described above with reference to FIG. 3, the recessed portion 30 of the crimped portion 20 in this example embodiment is formed such that the side surfaces 33 and 34 are inclined surfaces that are inclined in a direction approaching each other farther away from the first surface S1, in the Y-Y cross-section. Therefore, the opening 35 of the recessed portion 30 of the crimped portion 20 in the Y-Y cross-section is already open wide. Also, the side surfaces 43 and 44 of the protruding portion 40 of the crimped portion 20 in the Y-Y cross-section are also formed as inclined surfaces that are inclined in a direction approaching each other farther away from the second surface S2. Therefore, the sheet S does not have to be made to curve such that the first surface S1 bulges out, in the Y-Y cross-section.

Also, the rotor core 10 in which a predetermined number of sheets S are suitably joined by the crimped portions 20, inside the outer shape die 140, by stacking the sheets S stacked in the stacking portion 120, is able to be manufactured. Also, a rotating shaft assembly process in which a rotating shaft is assembled in the rotating shaft assembly hole 11 of the rotor core 10 and the like is performed in a post process on the rotor core 10 that has been removed from inside the outer shape die 140. Consequently, the rotor is manufactured.

As described in detail above, in the manufacturing method of the rotor core 10 according to this example embodiment, the crimped portion forming process that forms the crimped portion 20 having the recessed portion 30 on the first surface T1 side of the workpiece T and the protruding portion 40 on the second surface T2 side of the workpiece T is performed first. Then, the stacking process in which the sheet S is stacked while the outer shape S3 of the sheet S is formed by punching from the workpiece T is performed. In the stacking process, the punched sheet S is stacked, in a state in which the first surface S1 of the punched sheet S is curved so as to bulge out, on the second surface S2 of the sheet S held inside the outer shape die 240. The opening 35 of the recessed portion 30 of the crimped portion 20 of the punched sheet S is open wide because the first surface S1 of this sheet S is curved so as to bulge out. Thus, the protruding portion 40 of the crimped portion 20 of the sheet S inside the outer shape die 240 is able to be inserted into the recessed portion 30 in which the opening 35 is open wide, while following the side surfaces 31 and 32 of this recessed portion 30. As a result, a manufacturing method of a core for a rotary electric machine that enables two sheets in which crimped portions have been formed beforehand to be stacked as well as reliably joined together by the crimped portions, is realized.

The example embodiments are merely examples and do not limit the present specification in any way. Accordingly, the present specification may naturally be improved or modified without departing from the scope thereof. That is, in the example embodiment described above, punching of the workpiece T is performed after the protruding portion 40 of the crimped portion 20 of sheet S inside the outer shape die 240 is inserted into the recessed portion 30 of the crimped portion 20 of the workpiece T. However, punching of the workpiece T may also be performed first, and then, while the punched sheet S is placed in a curved state, the protruding portion 40 of the sheet S inside the outer shape die 240 may be inserted into the recessed portion 30 of this curved sheet S. Also, for example, the outer shape S3 of the sheet S after punching is naturally not limited to a circular shape as shown in FIG. 1. Also, for example, other machining such as that of the through-hole may also be applied to the sheet S. Also, for example, in the example embodiment described above, an example of the rotor core is described in detail, but the present specification may naturally also be applied to the manufacturing method of a stator core in which a plurality of sheets are joined together by crimping.

What is claimed is:

1. A manufacturing method of a core for a rotary electric machine, the core including a plurality of magnetic steel sheets each having a first surface and a second surface that is on a reverse side of the first surface, the plurality of magnetic steel sheets including a first magnetic steel sheet and a second magnetic steel sheet that is adjacent to the first magnetic steel sheet, the manufacturing method comprising:
  forming a crimped portion on both the first magnetic steel sheet and the second magnetic steel sheet, the crimped portion having a recessed portion that is recessed from the first surface and a protruding portion that protrudes from the second surface in a position on the reverse side of the recessed portion on the first surface; and stacking the first magnetic steel sheet and the second magnetic steel sheet while curving the first magnetic steel sheet such that the first surface bulges out, and inserting the protruding portion of the crimped portion of the second magnetic steel sheet into the recessed portion of the crimped portion of a curved first magnetic steel sheet.

2. The manufacturing method according to claim 1, wherein a punched sheet is a magnetic steel sheet after punching that forms an outer shape of the magnetic steel sheet is performed, a pre-punched sheet is a magnetic steel sheet before the punching is performed, the first magnetic steel sheet is the punched sheet, the second magnetic steel sheet is the pre-punched sheet, and the punching of the pre-punched sheet is performed in a state in which at least a tip end of the protruding portion of the crimped portion of the second magnetic steel sheet is inserted into the recessed portion of the crimped portion of the curved first magnetic steel sheet.

3. The manufacturing method according to claim 1, wherein a thrusting portion is used to curve the first magnetic steel sheet such that the first surface bulges out.

4. The manufacturing method according to claim 1, wherein each of the plurality of magnetic steel sheets each have a side surface that extends between the first surface and the second surface.

* * * * *

UNITED STATES PATENT AND TRADEMARK OFFICE
CERTIFICATE OF CORRECTION

PATENT NO. : 10,103,610 B2
APPLICATION NO. : 15/045988
DATED : October 16, 2018
INVENTOR(S) : Kouichi Mine It is certified that error appears in the above-identified patent and that said Letters Patent is hereby corrected as shown below:

In the Specification

Column 5, Line 67, after "second surface", delete "12" and insert --T2--, therefor.

Column 7, Line 19, after "crimping punch", delete "I11" and insert --111--, therefor.

Column 11, Line 61, after "second surface", delete "82" and insert --S2--, therefor.

Column 12, Line 13, after "embodiment,", delete "on" and insert --so--, therefor.

Column 14, Line 39, before "of the sheet", delete "82" and insert --S2--, therefor.

Signed and Sealed this
Fourth Day of December, 2018

Andrei Iancu
*Director of the United States Patent and Trademark Office*